N. A. KENNEDY.
TRACTOR.
APPLICATION FILED DEC. 20, 1917.
1,356,070.
Patented Oct. 19, 1920.
5 SHEETS—SHEET 5.
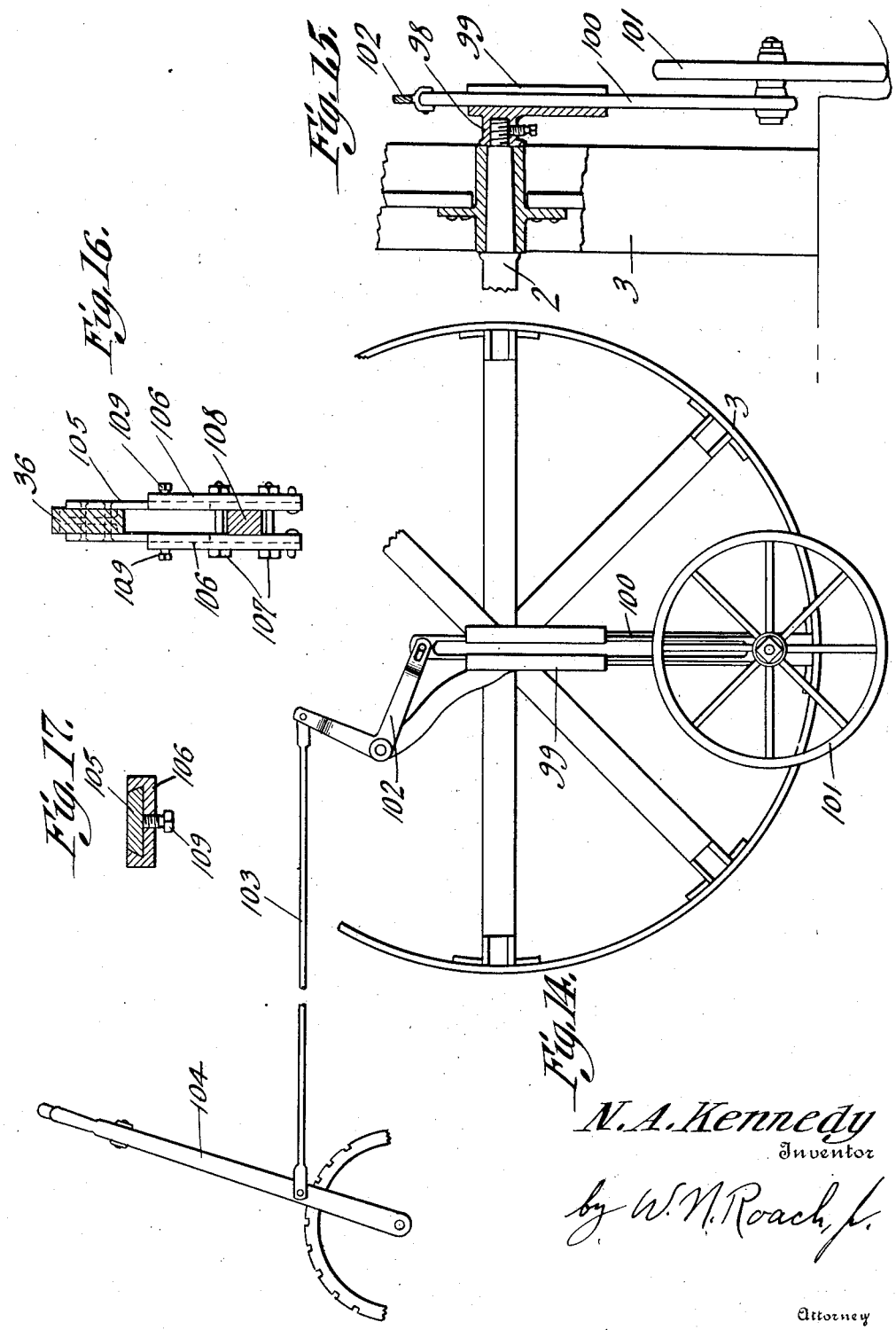

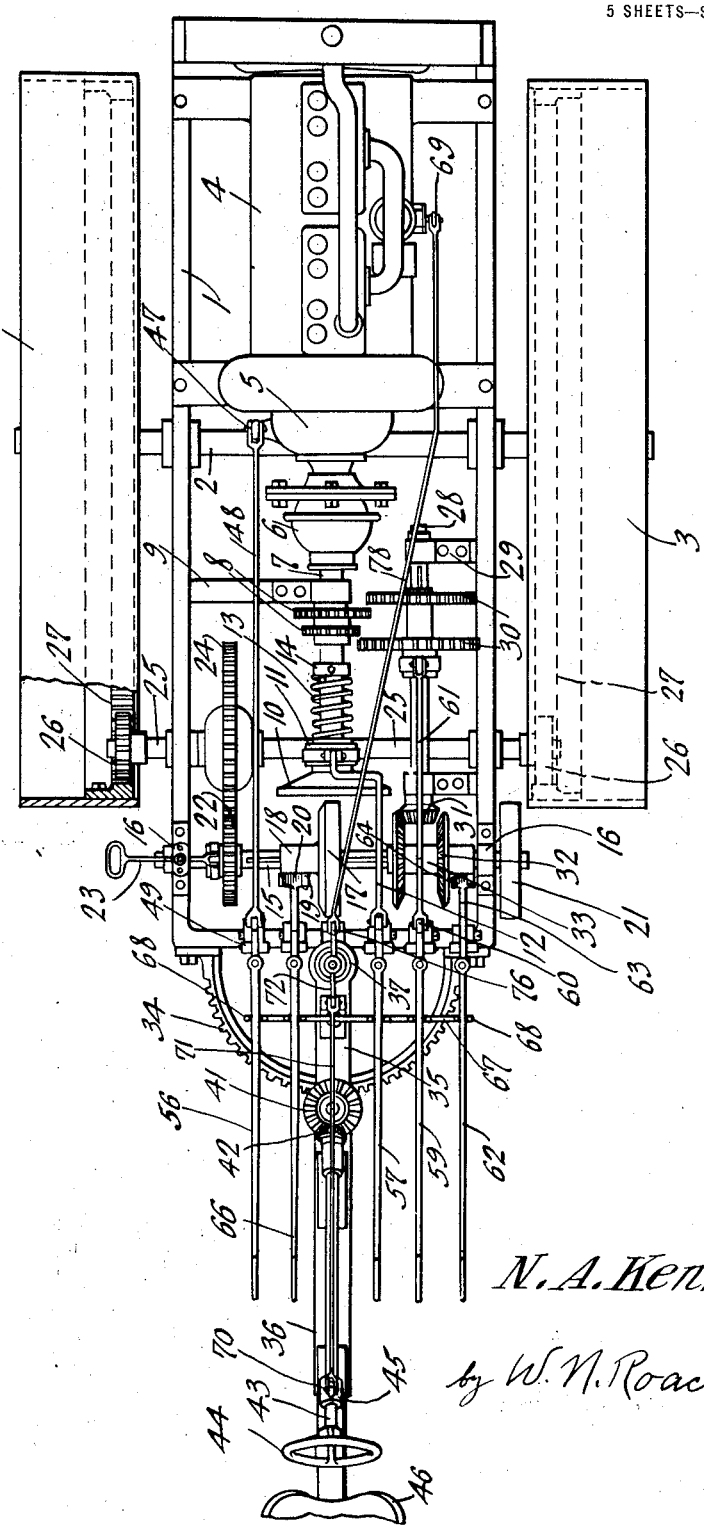

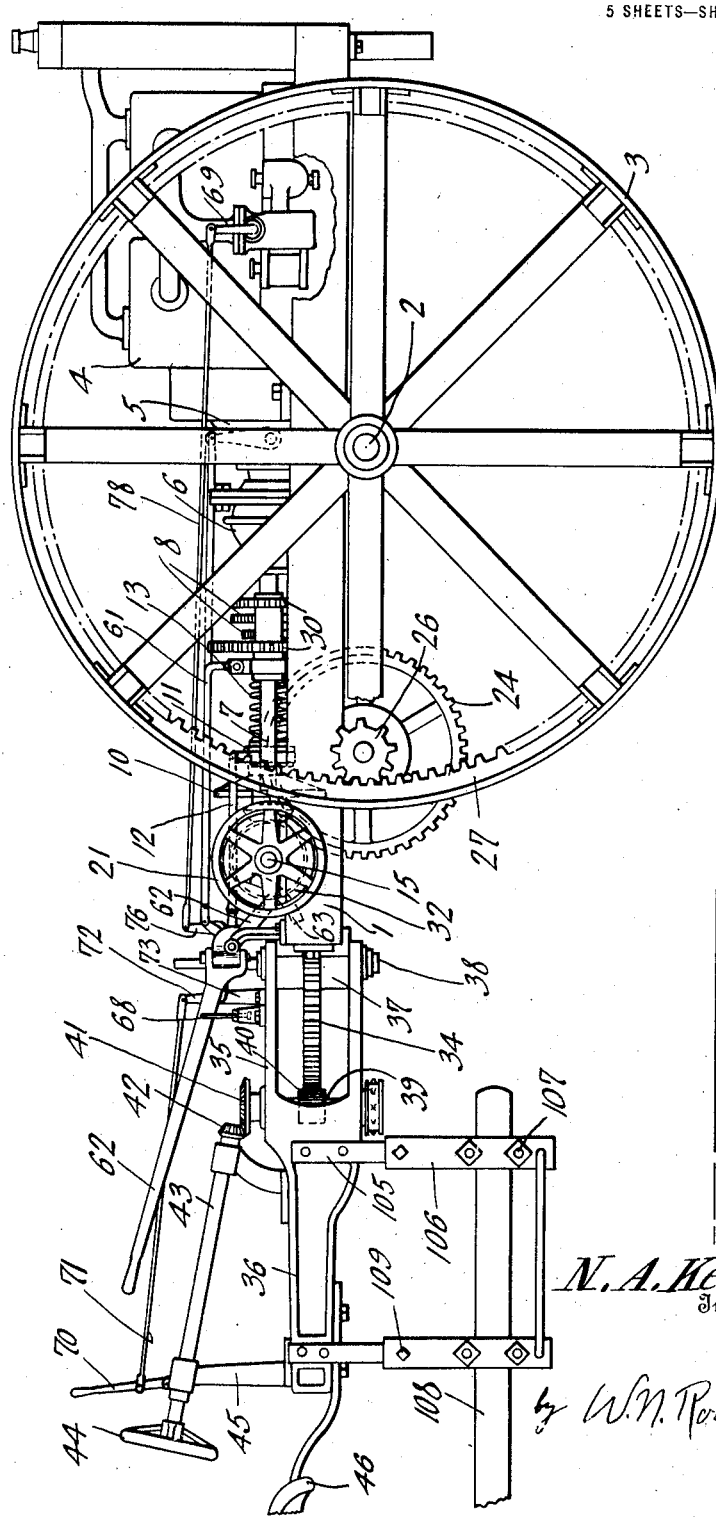

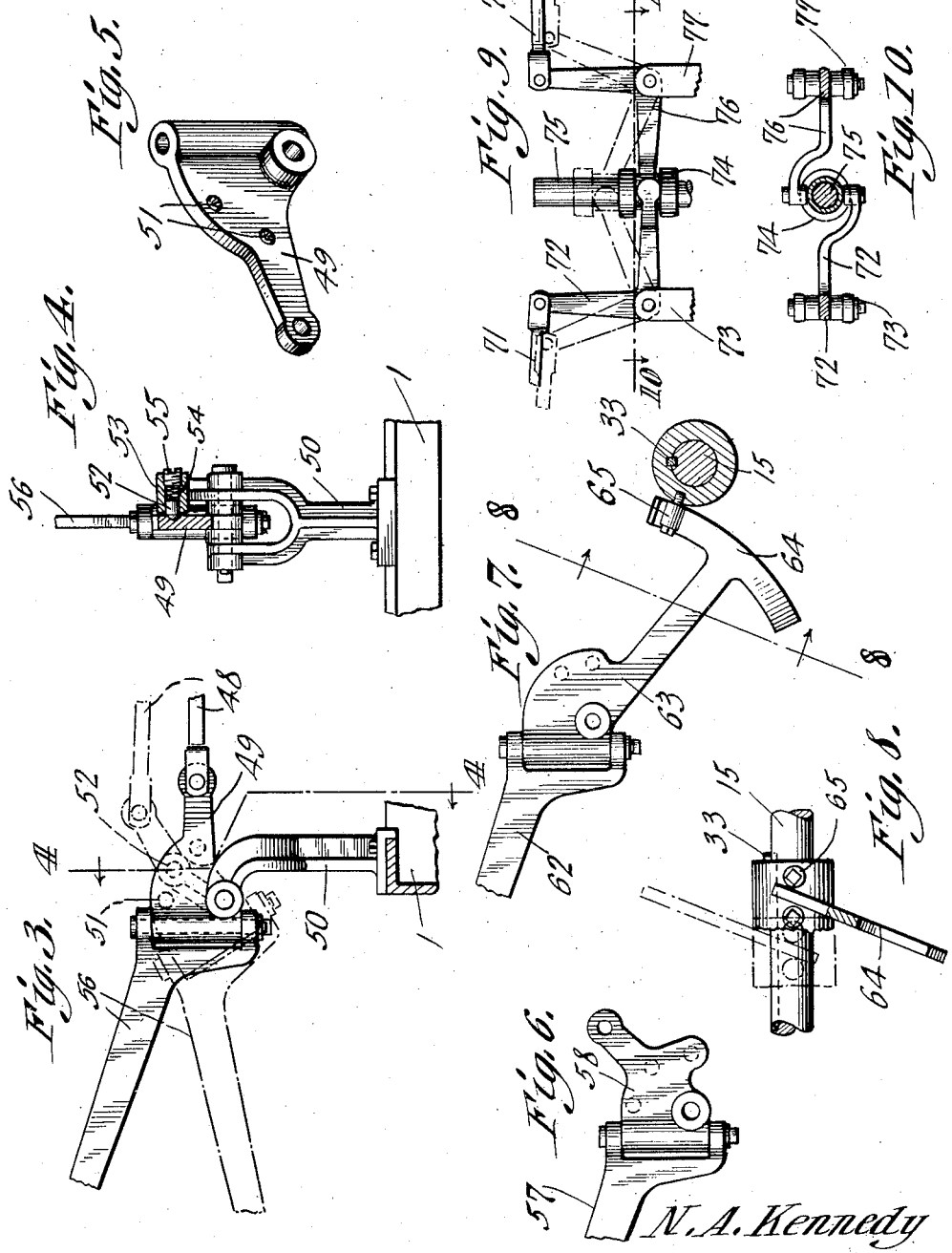

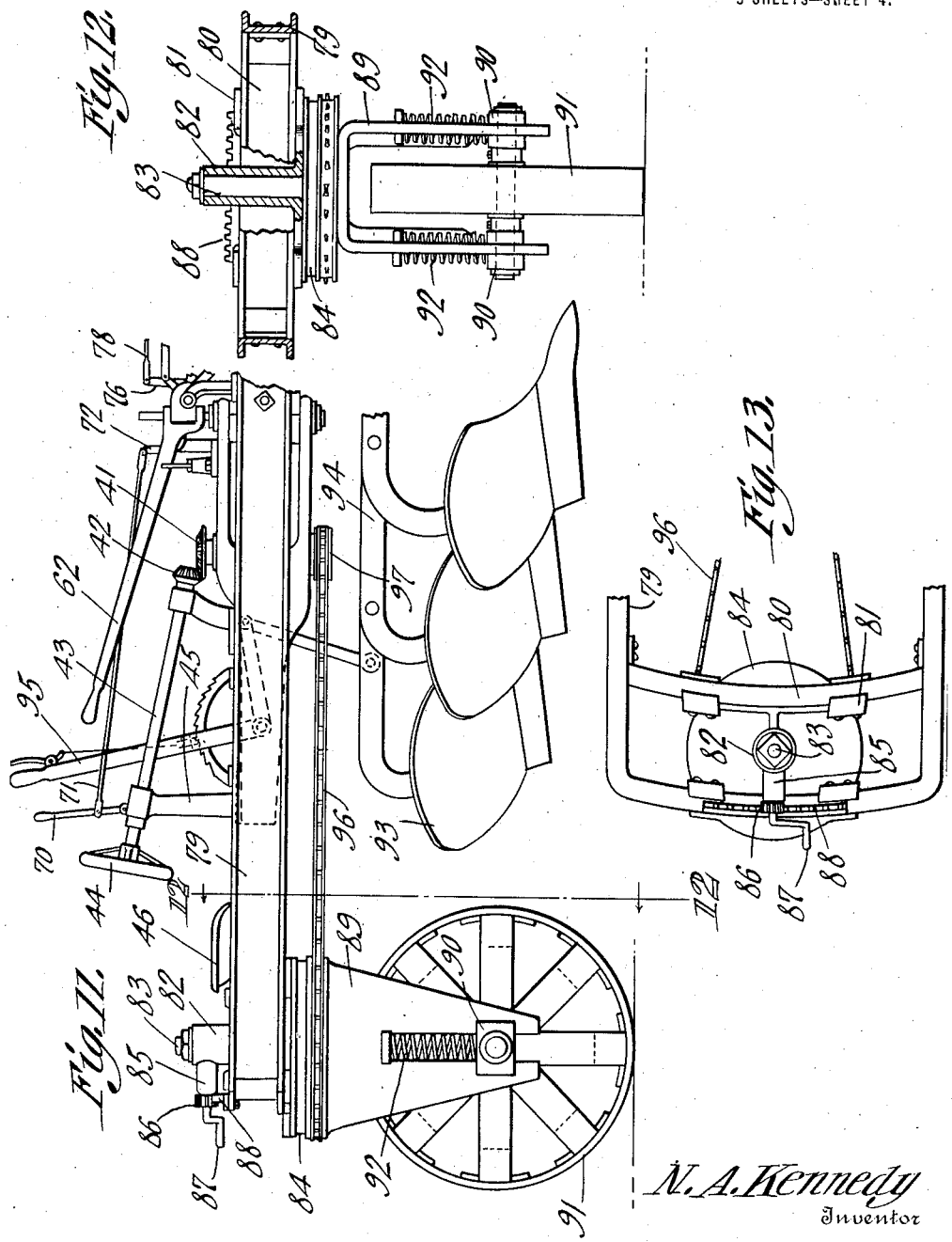

UNITED STATES PATENT OFFICE.

NOAH A. KENNEDY, OF CANDO, NORTH DAKOTA.

TRACTOR.

1,356,070.  Specification of Letters Patent.  Patented Oct. 19, 1920.

Application filed December 20, 1917. Serial No. 208,055.

*To all whom it may concern:*

Be it known that I, NOAH A. KENNEDY, a subject of the King of Great Britain, residing at Cando, in the county of Towner and State of North Dakota, have invented certain new and useful Improvements in Tractors, of which the following is a specification.

The subject of this invention is a tractor intended for drawing farming implements and the like, and contemplates a tractor of the two wheel type.

One of the main objects of the invention is to provide a tractor which may be geared to the usual low speeds when pulling a load, and may be shifted to a variety of speeds when traveling without a load or with a light load.

The invention also contemplates providing means for converting the tractor into a three wheel tractor for the purpose of allowing the device to be easily backed when necessary. This is of particular advantage when plowing, especially at fence corners, where a considerable space must usually be left.

The invention also contemplates the provision of suitable control levers which will always be in reach of the operator.

A further object of the invention is the provision of a simple, durable, and efficient tractor.

With the foregoing and other objects in view which will appear as the description proceeds, the invention consists in the novel arrangement and construction of parts hereinafter pointed out and claimed in the claims, it being understood that such changes in the structural arrangement and combination of parts may be made as fall within the spirit of the invention and the scope of the claims.

A practical embodiment of the invention is shown in the accompanying drawings, wherein:—

Figure 1 is a plan view of a tractor constructed in accordance with the invention, with the hood and other housings removed, and portions broken away;

Fig. 2 is a side elevation of the same;

Fig. 3 is a fragmentary detail in side elevation of the clutch lever;

Fig. 4 is a section on the line 4—4 of Fig. 3;

Fig. 5 is a view in perspective of the lever crank;

Fig. 6 is a detail fragmentary view in side elevation of the crank for throwing the driving friction disk;

Fig. 7 is a side elevation of the cam for throwing the reverse motion beveled gears;

Fig. 8 is a fragmentary sectional view on the line 8—8 of Fig. 7;

Fig. 9 is a fragmentary view in side elevation of the throttle control connection;

Fig. 10 is a section on the line 10—10 of Fig. 9;

Fig. 11 is a fragmentary view in side elevation of the third wheel attachment;

Fig. 12 is a sectional view on the line 12—12 of Fig. 11, portions broken away;

Fig. 13 is a fragmentary plan view of the third wheel platform mounting;

Fig. 14 is a fragmentary detail in side elevation of the guide wheel attachment;

Fig. 15 is a similar view in end elevation, partly in section;

Fig. 16 is a front elevation, partly in section, of the hitch;

Fig. 17 is a cross section of one of the hitch bars.

Referring to the drawings by numerals of reference:

In carrying out the invention there is provided a substantially rectangular oblong frame or chassis 1 which is supported on a horizontally disposed, transverse axle 2 on the protruding spindles of which turn the wheels 3.

Bedded on the frame or chassis 1 is a motor 4, of any preferred type, but herein shown as an internal combustion engine. The usual clutch housing 5 is secured at the rear of the motor, and adjacent this housing and to the rear thereof is a universal joint 6 which connects the drive shaft 7 to the clutch shaft.

The drive shaft 7 extends longitudinally of the tractor chassis and has rigid thereon the change speed gears 8. Upon the rearward end of the shaft 7 is feathered a friction disk 10 which has a grooved neck 11 engaged by the yoke end of a rod 12, by which the disk is thrown to bring it into or throw it out of gear. A compression spring 13 surrounds the shaft 7 and is confined between the neck 11 and a collar 14 which is secured on the shaft 7 and serves to force the friction disk 10 toward its rearmost position.

A shaft 15 extends transversely of the tractor chassis and is journaled in boxes 16 suitably secured on the side bars of the chassis. A flanged friction wheel 17 is feathered on the shaft 15 and has an extended hub 18 from which extend pins bearing rollers 19 which contact opposed faces of a cam 20 for the purpose of sliding the disk on the shaft and changing its position on the face of the friction disk 10 with which it is adapted to contact and by which it is driven. One end of the shaft 15 extends beyond its side bar of the chassis and on this end is secured a fly wheel 21, while within the chassis, and near the other end of the shaft 15, a spur-gear 22 is feathered on the shaft.

A lever 23 is fulcrumed on the chassis 1 and is operable to throw the spur-gear 22 in and out of mesh with a differential gear 24 interposed between the abutting ends of alining shafts 25 which are journaled in the chassis and extend transversely thereto. Upon the laterally extending end of each shaft 25 is secured a pinion 26 which is adapted to mesh with an internal gear 27 formed in each tractor wheel 3.

A countershaft 28 extends for a short distance longitudinally of the chassis and is journaled in suitable supports 29 which extend inwardly from one side bar of the chassis to which they are secured. Feathered on the forward end of this shaft are the change speed gears 30 which are adapted to be thrown to alternately engage the change speed gears 8. Rigid on the rear end of this counter shaft is a beveled pinion 31 which is adapted to alternately mesh with the beveled gears 32 which are integral on the hub 33, which hub is feathered on the shaft 15. These gears are used for driving the tractor when heavy pulling is desired and serve to reverse the direction of motion of the tractor when the same becomes necessary.

To the rear end of the tractor chassis is secured by bolts or otherwise a semicircular rack 34 which is embraced or straddled by the yoke end 35 of a rearwardly extending bar 36. A housing or boxing 37 is formed on the rear transverse bar of the chassis 1 and the ends of the yoke 35 rest on the ends of this housing, being pivotally secured thereto by a king-bolt 38 or otherwise.

The enlarged portion of the bar 36, adjoining the yoke 35, is cored to receive a vertically disposed shaft 39 on which is slidably mounted a pinion 40 adapted to mesh with the rack 34. A beveled gear 41 is rigidly secured to the upper end of the shaft 39 and meshes with a beveled pinion 42 which is rigid on one end of a steering post 43 on the other end of which is the steering wheel 44. Standards 45 are secured to and rise from the bar 36 and form a journaling means for the steering post 43. A seat 46 may be bolted or otherwise secured to the rear end of the bar 36.

As it is often desirable that the operator may be seated on the binder or harvester, or other trailer being drawn by the tractor, the steering post may be telescopic or an extension rod may be secured thereto to permit the steering wheel to be placed within reach of the operator. Under such circumstances extension rods would also be clamped to any of the control levers desired. As this forms no part of the present invention and may be carried out by any usual and well known means, specific structure therefor has not been shown.

As the tractor is of the two wheel type in which the main body or chassis of the tractor swings with relation to the operator's seat and the steering wheel, when the tractor is turned or guided, it becomes necessary to provide means for keeping the control levers within reach of the operator at all times. To this end the levers and their mountings now to be described have been devised.

The levers are all pivotally mounted, the axis of each pivoting pin lying in the vertical plane of the axis of the king bolt 38 which plane extends transversely of the tractor.

The clutch crank or stem is seen at 47, Fig. 1, and is connected by a rod or link 48 to one arm of a bell-crank 49 (see Figs. 3, 4, and 5) which is fulcrumed in the forked upper end of a standard 50 which is bolted or otherwise secured to the rear bar of the chassis 1. The bell-crank 49 is provided with a series of depressions 51 which are adapted to receive the tapered end of a pawl or click 52 which works in the bore of a block 53 supported on the standard 50. A compression spring 54 actuates the click and this spring is held in place by the small screw plug 55 which is threaded into the bore of the block. A lever arm 56 is pivotally secured to the bell-crank 49, as seen most clearly in Fig. 3.

The lever 57, which controls the driving friction disk 10, is similar to that just described and is pivoted to a bell-crank 58 which is mounted after the manner of the bell-crank 49. The bell-crank 58 is pivotally connected to the rod 12 which engages a yoke having engagement with the grooved collar 11 of the friction disk 10.

A similar lever 59, pivoted to a bell-crank 60, which bell-crank is connected by a link 61 to the change speed gears 30, is operable to throw the gears.

For the purpose of throwing the reverse motion gears 32, a similar lever 62 is provided which has pivotal connection with a bell-crank 63. The arm of the bell-crank 63 terminates in an arcuate cam strip 64 which is engaged between rollers 65 mounted on pins secured in the hub 33 of the gears 32. By throwing the lever 62 the cam strip is reciprocated between the rollers reciprocating the gears along the shaft 15, as seen most clearly in Fig. 8.

A similar lever 66 is provided for reciprocating the friction disk 17 and its bell-crank has a cam strip 20 which works between the rollers 19 turning on pins secured in the hub of the disk 17.

These levers are constrained to oscillate about their pivots by a horizontally disposed bar 67 which is pivotally secured to the bar 36 and from which rise pins 68 between which the levers work.

For the purpose of operating the throttle lever 69, a small hand lever 70 is pivotally mounted on the upper end of the rearmost standard 45 and is connected by a link 71 to one arm of a bell-crank lever 72 which is fulcrumed on a support 73 secured to the yoke 35. Referring more particularly to Figs. 9 and 10, the other arm of the bell-crank 72 engages the groove of a spool 74 which is slidable on a spindle 75 which rises from or is an extension of the king-bolt 38. An arm of another bell-crank 76 also engages the groove of the spool 74 and this bell-crank is mounted on the opposed side of the spindle from the bell-crank 72 and is fulcrumed on a support 77 which rises from the rear bar of the chassis 1. The other arm of the bell-crank 76 is connected by a link or connecting rod 78 with the throttle lever 69.

When the tractor is used for plowing it is desirable to convert it into a three wheel tractor so that it may be properly backed to get into fence corners and the like. For this purpose a three sided frame 79, see Figs. 11, 12, and 13, is provided which is bolted or otherwise attached to the rear ends of the side bars of the chassis 1 and the rear bar of this frame is curved to form an arc of a circle whose center lies in the axis of the king-bolt 38. A complemental curved bar 80 extends transversely of the frame 79 to which it is bolted or otherwise secured and this bar is suitably spaced from the rear bar of the frame.

Slidable in the channel of the rear bar and its complemental bar 80 is an H casting the ends of the legs of which have bent extensions 81 adapted to partially embrace the rear bar and the bar 80. The cross bar of the H has an enlarged central portion 82 which is cored to form a journaling box for the spindle 83 which rises from the center of a circular platform 84 which platform is suspended just below the rear bar of the frame and its complemental bar 80. A projection 85 extends rearwardly of and radially from the boxing 82 and in this projection turns a shaft on which is rigidly mounted a pinion 86. The shaft may terminate at its extending end in a crank or handle 87 by which the shaft is manually rotated. The pinion 86 meshes with a rack 88 which is secured on the rear bar of the frame 79 and by rotating the shaft and pinion 86 the H and the platform 84 are swung in an arc to adjust their position transversely of the tractor.

Secured to the platform 84 in any suitable manner and depending therefrom is a fork or yoke 89 the arms of which are bifurcated to receive the sliding journal boxes 90 in which turns the axle of a wheel 91. Compression springs 92 may be placed in the bifurcated portion of the yoke arms and bear downwardly on the boxes 90 to retain the wheel in its proper lowermost position.

As will be understood, the shifting of the H and platform 84 shifts the wheel 91 for the purpose of having the wheel in position to track in the furrow of the rearmost plow 93.

The plow standards 94 are hitched to the chassis of the tractor, preferably to the front bar thereof, in any usual and well known manner, and the plows may be raised and lowered by levers 95 or otherwise.

For the purpose of making the third wheel 91 a steering wheel, the platform 84 is in the form of a chain wheel which is geared through a chain 96 to a wheel or pulley 97 fast on the lower extending end of the shaft 39. While the connecting member 96 has been described and shown as a chain, it is to be understood that a cable or other flexible connector may be used if desired.

For the purpose of providing a guide wheel which will run in the furrow and indicate the proper position of the tractor, an extension 98, see Figs. 14 and 15, is threaded on the right-hand wheel spindle of axle 2 and this extension merges into a vertically disposed channel head 99 in which is slidably mounted for vertical movement a bar 100 in the lower end of which bar is secured a pin on which turns the guide wheel 101. The bar and wheel may be raised or lowered by a bell-crank lever 102 one arm of which is pivotally connected to the top of the bar 100 while the other arm is connected by a rod 103 to a suitably supported operating lever 104.

For the purpose of providing a hitch which will clamp the tongue of a harvester, wagon, or other trailer being drawn by the tractor, dovetail bars 105 are riveted or otherwise secured to each side of the beam 36, from which they depend and on these bars slide extension bars 106 which have longitudinal dovetail slots in which the bars 105 have a sliding fit. Bolts 107 pass through apertures in the extensions 106 and serve to clamp them on each side of a tongue 108. Set screws 109 are threaded through the extensions 106 and serve to clamp the extensions in adjusted positions on the bars 105.

Should the tractor be run by steam power or other equally flexible motor, the necessity for the friction drive herein shown would, of course be removed.

The tractor is started and run in the usual manner and the steering is accomplished as is usual on two wheel tractors using steering gear of this type.

When plowing or performing other heavy labor, the gears 32 are shifted to bring one or the other, depending on the direction of motion desired, into gear with the pinion 31. This drives the shaft 15 and, through the differential 24, the shafts 25. Rotation of the shafts 25 rotates the pinions 26 which impart rotary motion to the wheels 3. During this operation the friction disk 10 is thrown out of contact with the friction wheel 17.

When the tractor is being moved from place to place or drawing a light load and it is desired to secure greater speed than is possible with the gearing just described, the gears 32 are thrown out of gear with the pinion 31 and the friction disk thrown in contact with the friction wheel 17. By shifting the friction wheel 17 across the face of the friction disk 10 a variety of speeds may be obtained and, by shifting the wheel 17 to one side or the other of the center of the friction disk 10 a reversal of motion is had.

Having thus described the invention, what is claimed as new and sought by Letters Patent, is:—

A tractor, including a wheel supported chassis, a motor secured on the chassis, a main drive shaft driven by the motor, gearing between the drive shaft and the tractor wheels for driving the wheels from the motor, a bar pivotally secured to and extending rearwardly of the chassis, a steering post journaled on the bar, steering gear between the post and the chassis for swinging the chassis to either side with respect to the rearwardly extending bar and post, control levers pivotally secured to the chassis, and means for retaining said levers in their relative positions with respect to the rearwardly extending bar during the swinging movement of the chassis.

In testimony whereof I hereunto affix my signature.

NOAH A. KENNEDY.